UNITED STATES PATENT OFFICE.

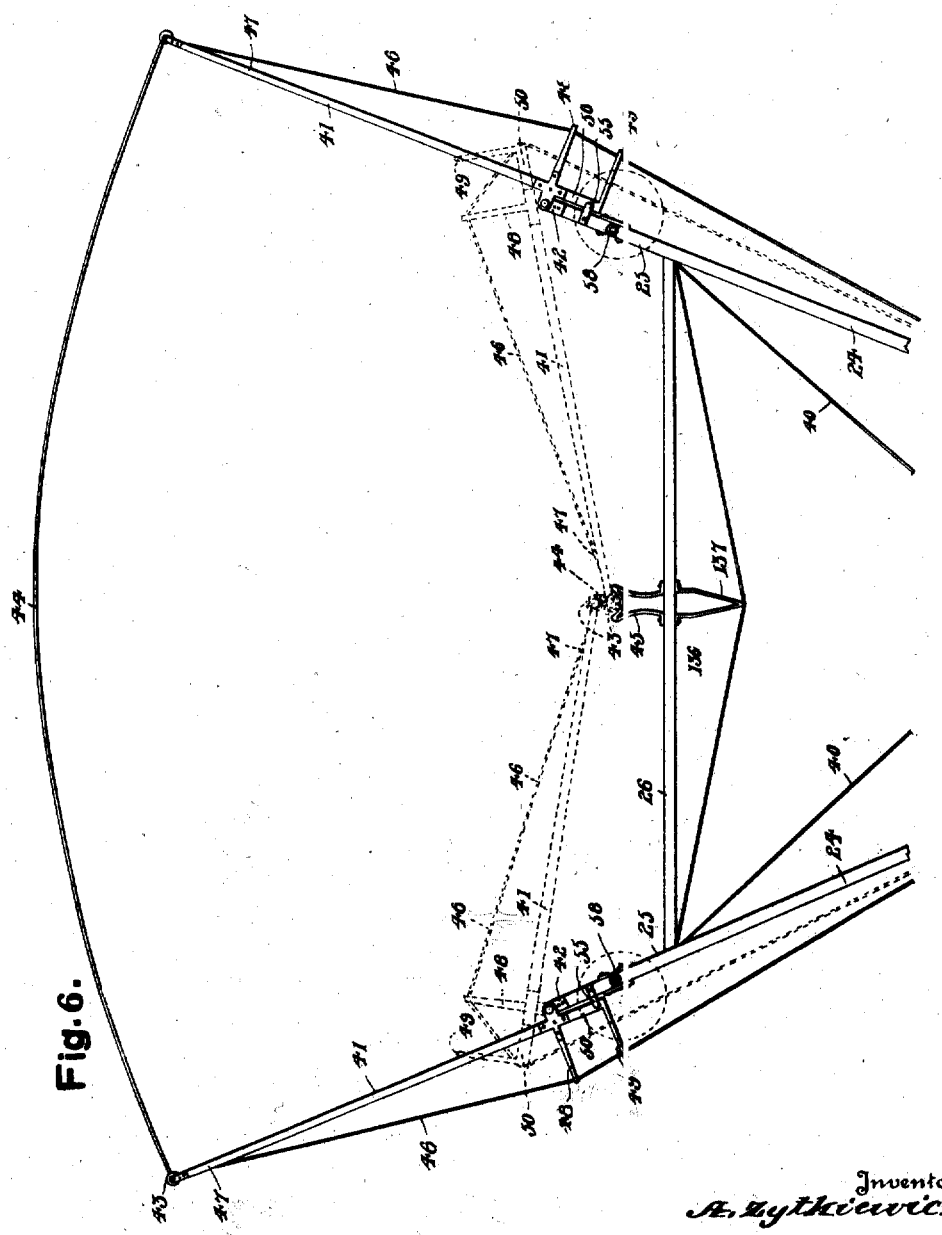

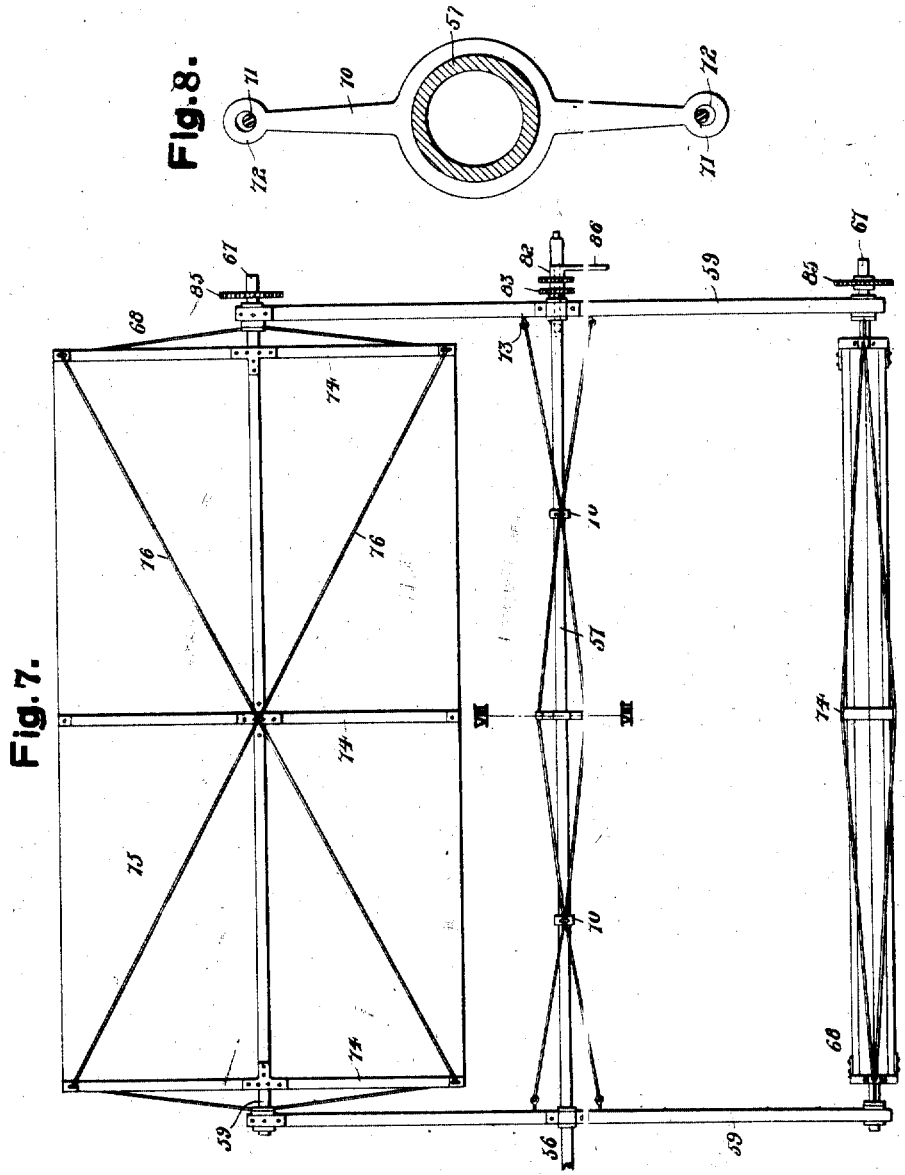

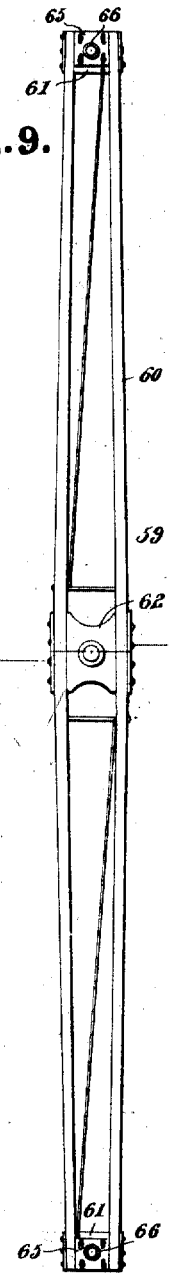
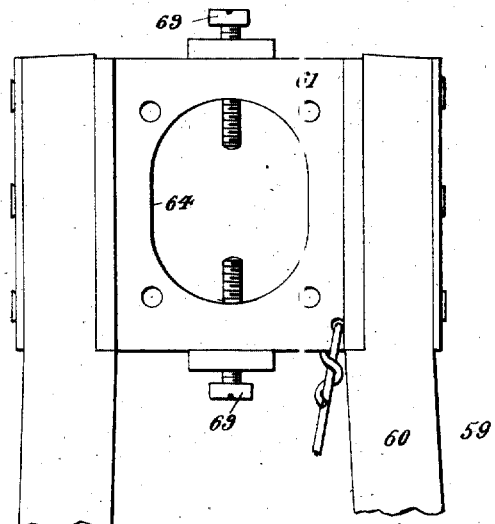
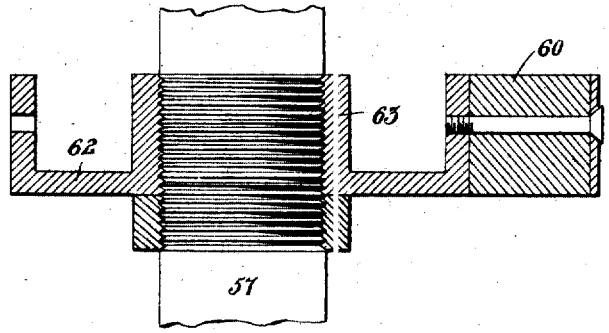
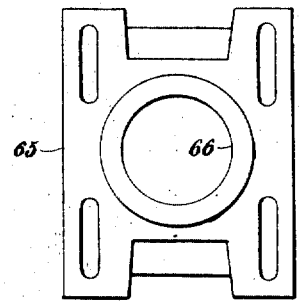

ADOLF ZYTKIEWICZ, OF MERIDEN, CONNECTICUT.

FLYING-MACHINE.

1,219,616.  Specification of Letters Patent.  Patented Mar. 20, 1917.

Application filed July 12, 1915. Serial No. 39,317.

*To all whom it may concern:*

Be it known that I, ADOLF ZYTKIEWICZ, a subject of the Emperor of Austria-Hungary, residing at Meriden, in the county of New Haven and State of Connecticut, have invented certain new and useful Improvements in Flying-Machines, of which the following is a specification.

This invention relates to certain new and useful improvements in flying machines.

The primary object of this invention is to provide a heavier-than-air flying machine in the nature of a helicopter adapted for rising to the desired height and being maintained in its travel by the control of a propelling motor and having a convenient steering device.

A further object of the invention is to provide a vehicle with motor driven revoluble elevating planes and with a rearwardly positioned pivotally controlled similarly constructed steering device, whereby the operator may accurately control his flight through the air.

A still further object is to provide a normally closed parachute attachment upon a flying machine, which parachute may be readily opened for operation by the aeronaut whenever desired, thus preventing the device from being injured by falling to the earth in the event of any accident to the operating mechanism.

Among the other objects of the invention which might be mentioned is the individual control for each of the elevating and steering devices, whereby the device is more accurately controlled, while the machine is formed of metallic bound and reinforced wooden framework rendering the same light and efficient although being easy and inexpensive to manufacture.

With these general objects in view and others that will appear as the nature of the invention is better understood, the same consists in the novel combination and arrangement of parts hereinafter more fully described, illustrated in the accompanying drawings and pointed out in the appended claims.

In the drawings forming a part of this application and in which like-designating characters refer to corresponding parts throughout the several views, Figure 1 is a front elevation of the forward portion of the device, the rear portion thereof not being illustrated and the revolving planes of the elevating side wings being shown in dotted lines in one position.

Fig. 6 is an elevational view of the parachute attachment in its open position and shown by dotted lines in its closed position.

Fig. 7 is a top plan view of one of the side elevating wings detached.

Fig. 8 is a transverse sectional view taken upon line VIII—VIII of Fig. 7.

Fig. 9 is a side elevation of one of the plane supporting beams of a side wing.

Fig. 10 is an enlarged elevational view of an end portion of one of the wing beams.

Fig. 11 is a side elevation of a positioning plate employed with the wing beams, and Fig. 12 is a transverse sectional view taken upon line XII—XII of Fig. 9.

Figure 1:
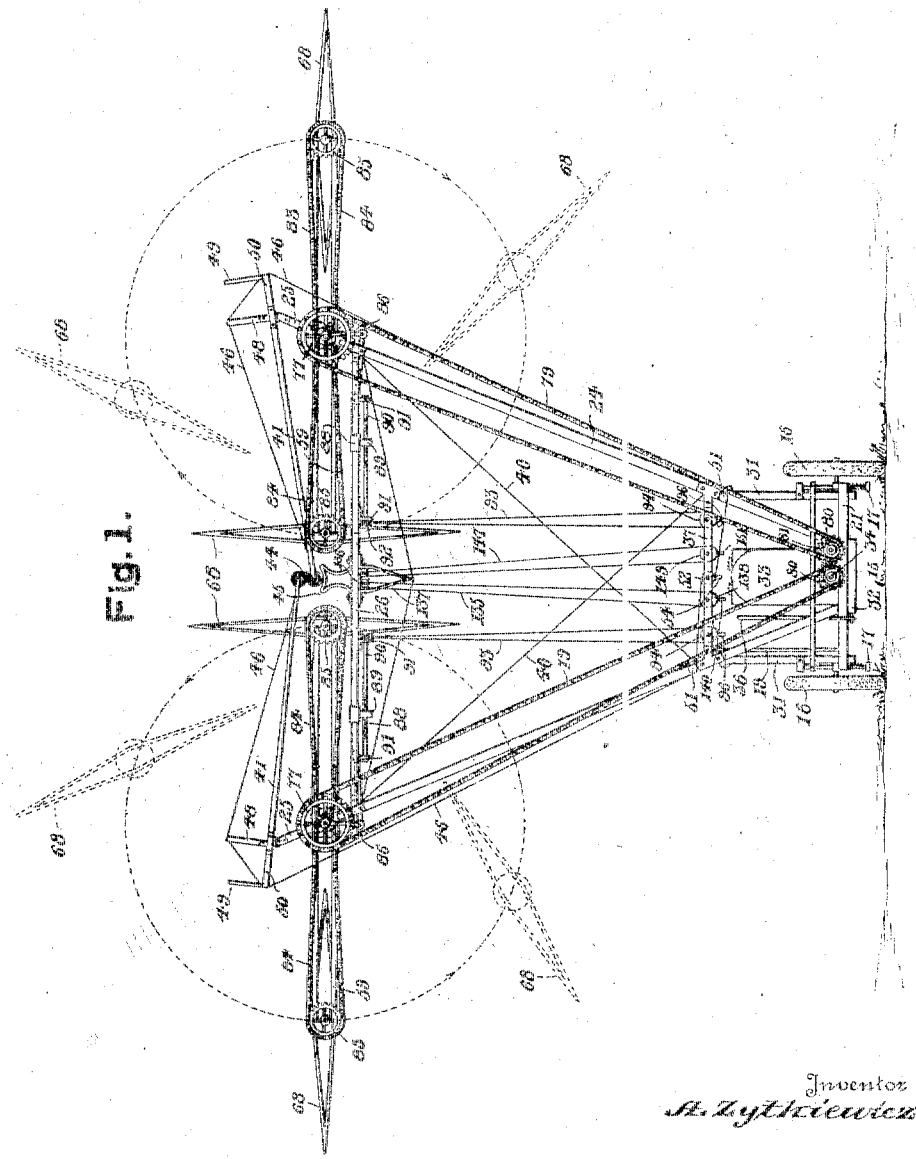
Figure 2:
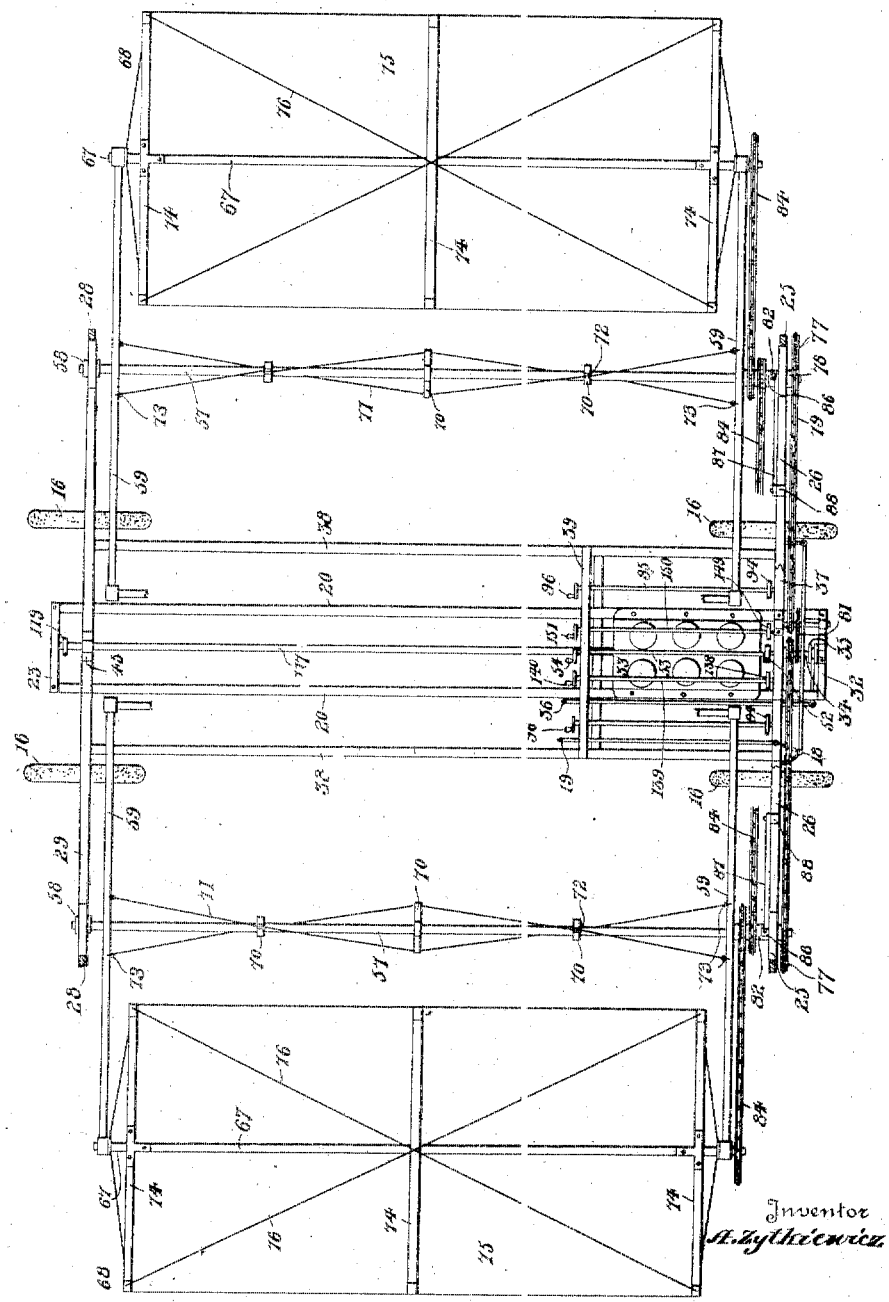
Fig. 2 is a top plan view thereof with upper and forward portions removed.
Figure 3:
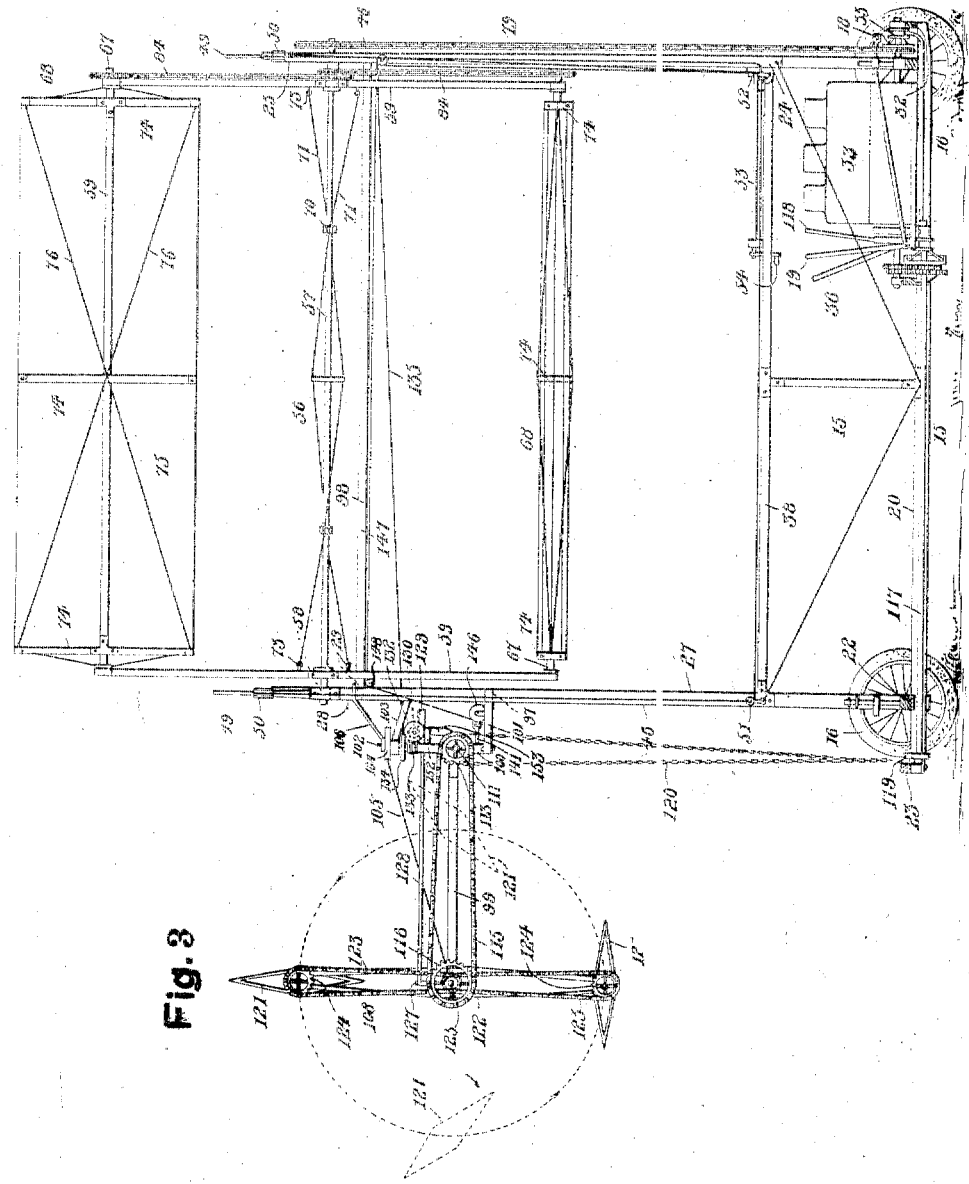
Fig. 3 is a side elevation of the complete device with ground wheels at one side thereof removed and the axles and adjacent members being shown in vertical section.
Figure 4:
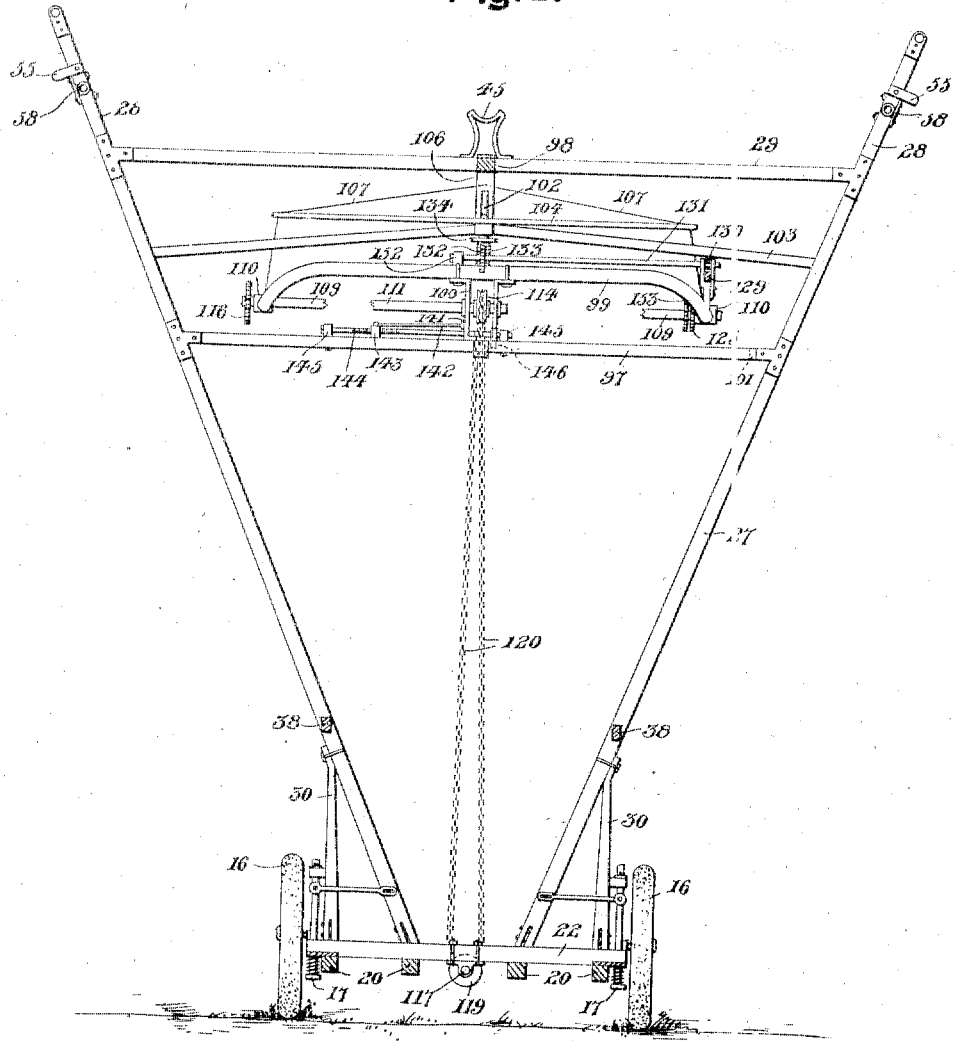
Fig. 4 is an elevational view of the inner side of the rear vertically-arranged frame of the device illustrating parts of the steering mechanism and having portions broken away and removed with the vehicle frame partially in vertical section.
Figure 5:
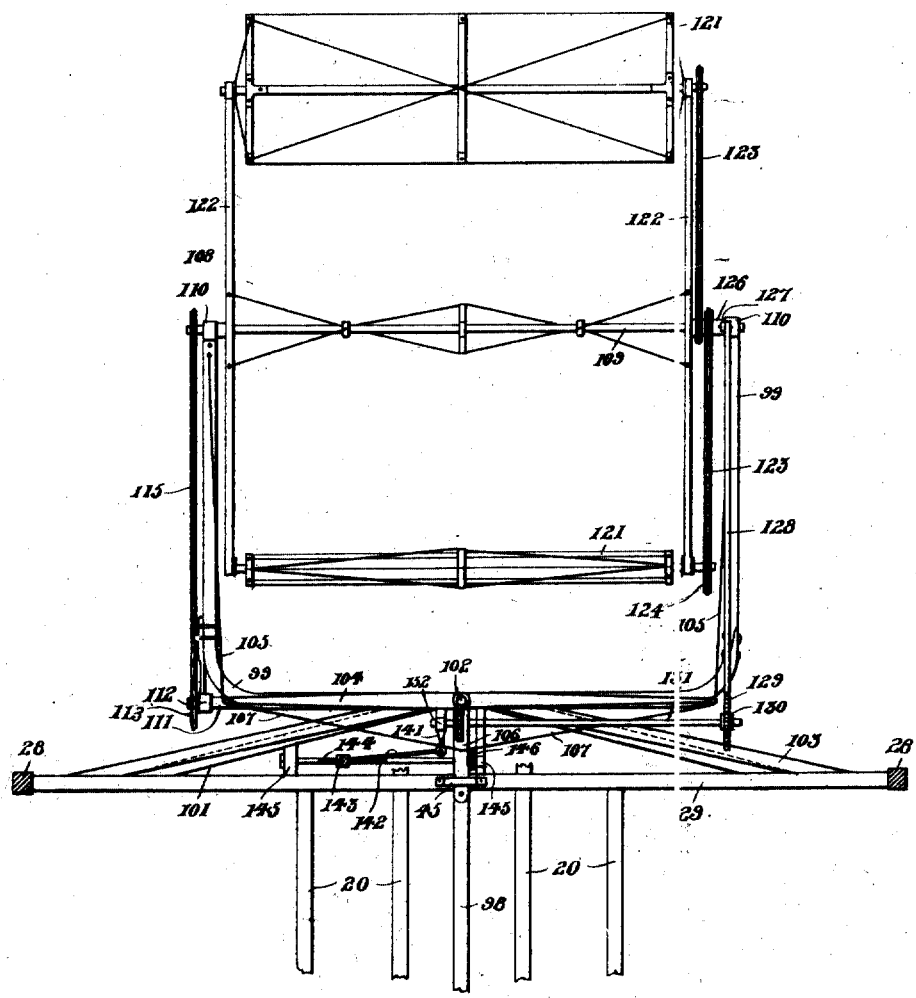
Fig. 5 is a top plan view of the rearwardly positioned steering device the adjacent portion of the machine frame being illustrated.

The present invention in flying machines provides a vehicle or carriage 15 for supporting the complete mechanism when positioned upon the ground, the said carriage having four ground wheels 16 provided with suitable shock-absorbers 17 and having a steering mechanism 18 operated in any desired manner by a steering lever mechanism 19.

The said carriage has a bottom frame formed with parallel longitudinal bars 20 having a forward cross piece 21 and a rear cross piece 22 connecting the same, while the centrally positioned pair of bars are rearwardly projected and are connected by a short cross piece 23 thus providing an auxiliary rear rectangular frame directly beneath the steering mechanism hereinafter described. A substantially triangular frame 24 is forwardly positioned vertically upon the carriage and has its apex portion downwardly positioned uniting with the front cross piece 21, while the side members of the frame 24 are provided with diverging extensions 25 upwardly of the horizontally arranged base 26 of the said frame 24, the said extensions 25 being adapted for mounting the parachute attachment hereinafter set forth.

A rear frame 27 is mounted upon the vehicle cross bar 22 in substantially the same manner as the forwardly positioned frame 24 which is of similar dimensions and the said rear frame is likewise provided with upper side extensions 28 above the horizontal top bar or base 29 thereof. The rear frame is braced upon the cross bar 22 by means of vertical struts 30, while the front frame 24 is similarly braced upon the front cross piece 21 by vertical struts 31.

The two bars 20 are also forwardly extended and are provided with a forward cross bar 32. A motor 33 is centrally positioned forwardly of the vehicle upon the centrally-arranged bars 20 and has a power shaft 34 provided with a clutch 35 adjacent the forward cross piece 32, the said clutch being controlled by means of the operating lever 36 positioned slightly to the rear of the motor and at a convenient point to be grasped by the aeronaut.

A supporting bar 37 is positioned between the sides of the frame 24 in parallelism with the front cross piece 21 of the vehicle and is arranged in a plane slightly above the motor 33, while rearwardly extending bars 38 are arranged in the same horizontal plane as the bar 37 and connect the front and rear frames 24 and 27 respectively together. A transverse bar 39 connects the bars 38 rearwardly of the motor 33 and in parallelism with the front cross bar 37. Bracing wires 40 are arranged in X-shaped formation crossing each other and positioned between the parallel bars 26 and 37 of the vehicle frame 24.

Parachute.

Parachute supporting rods 41 are oppositely arranged pivoted to the upper extensions 25 and 28 of the front and rear frames 24 and 27 respectively, pivot brackets 42 forming the connection between such extensions and rods. Receiving rollers 43 are journaled between the upper ends of each pair of front and rear rods 41, the said rollers having a fabric canopy 44, wound thereon and secured at its opposite ends thereto. The said rollers 43 are preferably retained normally with the canopy or parachute fabric 44 rolled up thereon by spring means not shown and after the manner of the usual window shade roller, the said rollers being normally positioned in superposed relation and resting upon similar brackets 45 centrally arranged upon the upper frame bars 26 and 29, the forward arrangement being as illustrated in Figs. 1 and 6.

Operating cords 46 are provided for the parachute rod 41, one end of each cord being secured as at 47 adjacent the free end of each rod and passing over a post 48 perpendicularly mounted upon the rod adjacent its pivoted bracket 42, while the cord then passes through a slotted post 49 mounted at the end of a rear extension 50 with which each of the rods 41 is provided. The cords then pass downwardly spaced from the outer sides of the adjacent frames 24 and 27 and run over pulleys 51 upon the said frames and thence to a drum 52 upon a centrally arranged shaft 53 which is journaled through the bars 37 and 39 of the carriage which shaft terminates in an operating crank 54 rearwardly of the motor and adjacent the operating levers 19 and 36.

By this arrangement it will be seen that with the parachute attachment normally arranged in its closed position as illustrated in Fig. 1, the crank 54 may be turned for winding up all of the four cords 46 of the supporting rods 41 upon the drum 52, whereby all of the said rods will be swung outwardly upon their pivotal connections 42 to their open positions as best illustrated in Fig. 6. This opening and separation of the rods 41 unreels the canopy 44 from the rollers 43, which canopy is then stretched between the separated rollers 43 and presents a parachute canopy of relatively wide area and over-spreading substantially the entire flying machine. The posts 49 act as guides for the cords 46, while the rod extensions 50 position themselves between opposite lugs 55 upon the adjacent portions of the frame extensions 25 and 28. Upon releasing the crank 54 and turning the same in an unwinding direction, the spring rollers 43 will automatically rewind the canopy 44 thereon and the rods 41 will be drawn inwardly where the rollers will again assume their normal rest position as illustrated in Figs. 1 and 6 of the drawings.

The elevating wings.

Elevating wings 56 are arranged for raising and maintaining the machine in the air, each of the said wings being revolubly mounted by means of an axle 57 journaled in bearings 58 of the frame extensions 24 and 28. The two oppositely arranged wings being identical, only one of the same will require a description herein and the same designating characters will be employed for each. The journaled axle 57 is provided with oppositely arranged parallel beams 59 secured adjacent the opposite ends of the axle inwardly of the end frames 24 and 27, the said beams being formed of wooden strips 60 having end blocks 61 secured therebetween and with a centrally arranged spaced block 62. The axle 57 is formed of three sections having the adjacent ends screw-threaded to be threaded into the central sleeves 63 of the space blocks 62 of the opposite beams 59 and has separate end portions for journaling the wings in the machine frame.

The beam blocks 61 are each provided with a central opening 64 over which positioning plates 65 are adjustably secured, the said plates 65 having central journaling openings 66 through which the shafts 67 of planes 68 are journaled, the said blocks 61 being provided with opposite adjusting screws 69 if desired as only illustrated in Fig. 10 of the drawings, which will further hold the shafts 67 centrally positioned of the blocks 61.

The wings 56 are provided with a centrally arranged bracing means comprising three armed brackets 70 secured to the axles 57, while bracing wires 71 extend through the perforations 72 of the arms of the said brackets 70 and are secured at their opposite ends to eyes 73 carried by the inner sides of the beams 59, it being noted that the brackets 70 are arranged oppositely projecting from the axles 57.

The winged planes consist of three frames 74 carried by the shaft 67 in parallel relation and provided with a canvas covering 75 for affording air engaged surfaces and are provided with strengthening wires 76 diagonally arranged there-across. A driven sprocket 77 is arranged upon a collar 78 journaled upon corresponding ends of the wing axles 57 and drive chains 79 pass over the sprockets 77 and over driving sprockets 80 positioned adjacent the front cross piece 21 of the carriage and forwardly of the motor 33. The sprockets 80 are simultaneously operated by the motor 33 and are controlled by the afore-mentioned clutch 35, it being noted that a gear connection 81 is arranged for effecting this simultaneous operation.

A sleeve 82 is journaled upon the axle 57 of each of the wings 56 between the forward frame 24 and the adjacent beam 59 of the wing. Two identical sprocket wheels 83 are secured to the said sleeve 82 and are provided with separate sprocket chains 84 passing thereover and also over relatively larger sprocket wheels 85 secured to the said planes.

It will thus be seen that when the motor 38 is in operation, the lever 36 may be employed for operating the clutch 35 thereby communicating power to the wheels 80 and through the chains 79 and the sprocket wheels 77 operatively turning the axles 57.

The mechanism for controlling the point of feathering of the planes 68 includes the sleeves 82, each of which is provided with an operating handle 86 which is connected by means of a link 87 pivotally connected to the free end of the handle 86 and to a sliding sleeve 88 arranged upon the top bar 26 of the front frame 24. The sleeve 88 has a threaded nut 89 depending therefrom through which a threaded rod 90 extends, the said rod 90 being journaled in suitable brackets 91 depending from the said bar 26 and arranged at opposite sides of the sleeve 88. The inner end of the rod 90 is provided with a pulley 92 over which an endless cord 93 is passed which cord extends downwardly and also passes over a pulley 94 carried by an operating shaft 95 similarly mounted and arranged parallel to the afore-mentioned parachute operating shaft 53. An operating crank 96 is provided at the inner end of the shaft 95 adjacent the rear end of the motor 33. By turning the operating crank 96, similar motion is imparted to the threaded rod 90, which shifts the sleeve 88, the link 87 and the handle 86. The sleeve 82 being journaled on the axle 57, and the gears 83 being fixed to the sleeves, such movement of the sleeves and gears relative to the machine frame will change the feathering point of the planes 68, through the medium of the sprockets 85 and chains 84. This adjustment of the feathering point of the planes 68 will permit the machine to descend while the motor is running at full speed.

Each of the wings 57 being thus provided with a controlling sleeve 82 operable by identical cranks 96, it will be seen that individual controlling means are thus provided for the wings, while the lever 36 controls the main clutch of the motor as heretofore noted. When the clutch 35 is thrown in, the wings 56 will be revolved, while on account of the stationary position of the sprockets 83, the planes 68 will each be individually revolved and the gearing is so arranged that the planes 68 will be given one-half a revolution upon their individual axial shafts 67 during a complete revolution of the wings 56. The direction of operative rotation of the wings is inwardly and upwardly as illustrated by the arrows in Fig. 1 of the drawings, while the movement of the planes is also illustrated by dotted lines therein, it being seen that the planes are positioned approaching a horizontal plane, while passing outwardly and downwardly and thereby offering the greatest resistance to the air during such movements, while the planes are substantially vertically arranged when passing inwardly and upwardly through the framework of the machine and thus offering the minimum amount of resistance during this inoperative or return movement of the planes. When the machine is positioned stationary upon the ground, an operating of the wings by means of the motor results in elevating the machine off the ground after the manner of a helicopter and after being so elevated, the machine is sustained in the air and may be controlled in lowering or rising during its flight by the proper control of the speed of the motor.

Steering device.

A steering mechanism is provided at the rear of the machine being supported by the rear frame 27. A cross bar 97 is carried by the rear frame 27 parallel to and in spaced relation beneath the upper bar 29 thereof. A centrally arranged bar 98 connects the central points of the top bars 26 and 29. The steering means provides a U-shaped main frame 99 having a centrally arranged depending U-shaped bracket 100 which is journaled in the apex portion of a V-shaped supporting brace 101 carried rearwardly by the afore-mentioned cross bar 97 and an upwardly projecting post 102 carried centrally by the steering frame 99 above the bracket 100 and this post 102 is journaled in the apex portion of an upper V-shaped brace 103 projecting rearwardly from the opposite sides of the rear frame 27. A stay bar 104 is centrally mounted upon the post 102 above the brace 103 and is connected by guy wires 105 with the side arms of the steering frame 99, the said guy wires being secured adjacent the opposite ends of the stay bar 104. An iron brace 106 is centrally secured to the top bar 29 of the rear frame and has an upper end of the steering post 102 journaled in the outer free end thereof, while a guy wire 107 is centrally secured to the iron brace 106 and is attached adjacent the opposite ends of the stay bar 104.

A steering wing 108 is provided with an axle 109 journaled in the oppositely arranged ends 110 of the steering bracket 99 and the said wing is formed identical with the two side wings 56 and is operable similarly thereto although the said rear wing is of lesser dimensions than either of the side wings. A shaft 111 is journaled through the bracket 100, the bearing 112 being provided therefor upon the brackets 99 and is provided on its outer end with a sprocket wheel 113 and at a point within the bracket 100, with a chain pulley 114. A chain 115 runs over the sprocket 113 and also over a relatively larger sprocket wheel 116 carried upon a projecting end of the axle 109 on one side of the frame 99.

A rearwardly extending power shaft 117 is provided for the motor 33 governed by the clutch lever 118 and having a chain pulley 119 adjacent its rear end, while a chain 120 runs over the said shaft pulley 119 and the bracket pulley 114.

The steering wing 108 being provided with planes 121 journaled in opposite beams 122 carried by the afore-mentioned axle 109, the said planes are operable the same as the elevating planes by means of sprocket chains 123 running over sprocket wheels 124 of the planes and over relatively smaller sprocket wheels 125 carried by a sleeve 126. An arm 127 is secured to the said sleeve 126 and is operable by means of a rod 128 having a toothed rack portion 129. A pinion 130 is provided upon a shaft 131 and is in constant mesh with the said rack 129, while a worm gear 132 is mounted upon the said shaft 131 and is in constant mesh with a worm 133 which is journaled upon the post 102 above the frame 99 upon which the said post is mounted. The shaft 131 is journaled in brackets 152 and 153 carried by the steering frame 99.

A pulley 134 is secured to the worm 133 and is provided with an operating cord 135 running thereover and extending forwardly, and passing over a pulley 136 within a depending V-shaped bracket 137 centrally arranged beneath the front bar 26. The cord 135 being an endless one, is then passed over a pulley 138 upon a shaft 139 which is supported similarly to and arranged parallel with the afore-mentioned parachute operating shaft 53. An operating crank 140 is provided upon the shaft 139, and it will be evident that by turning the said crank 140 that the pulley 134 may be revolved for turning the worm 133 and the gear 132 which revolves the shaft 131 and thus longitudinally shifts the clutch rod 128, whereby the operating chain 115 may be operatively connected or disconnected from the steering wing axle 109 by any desired form of clutch members, not herein illustrated. By this arrangement, it will be seen that the steering wing 108 is propelled by means of the motor 33, while the lever 118 controls the connection of the motor with the operating shaft 117 of the steering wing and the crank 140 controls the operation of the steering wing.

A steering arm 141 is carried by the bracket 100 and is connected by means of a pivoted link 142 with a shiftable nut 143 screw-threaded upon an operating rod 144 which rod is journaled in brackets 145 carried by the rear frame arm 97 and brace 101.

A pulley wheel 146 is carried by the rod 144 and is provided with an endless operating cord 147 running over the same and over a pulley 148 carried by the central bar 98, the said cord 147 thence passing forwardly over the afore-mentioned pulley 136 and thence downwardly over a pulley 149 carried by a shaft 150, supported similarly to the afore-mentioned parachute operating shaft 53 and in parallelism therewith. An operating crank 151 is provided upon the shaft 150, whereby the steering arm 141 may be readily turned from side to side by the aeronaut and the course of the machine accurately directed as may be desired, it being understood that the planes 121 of the steering wing are operated at a desirable speed simultaneously with the steering operation.

The complete operation of the present flying machine will now be fully understood from the above detailed description of the separate mechanical parts and the functions thereof. The motor 33 may be started to propel forwardly a machine upon the traction wheels 16 and the lever 36 may be operated by the aeronaut to place the motor in operative connection with the elevating plane driving sprockets 77. The change in the lifting effect of either or both of the side elevating wings 56 may be readily accomplished by actuating the desired one of the controlling cranks 96. The rear clutch lever 118 may be then moved for operating the axle gear 116 of the rear wing 108 and the crank 140 is then actuated for controlling the steering wing sleeve 126, whereby the wing 108 and its planes 121 may be operated in the desired manner. The side wings 56 are relied upon for controlling the altitude of the machine which is accomplished by regulating the speed with which the said wings are propelled, this being controlled by varying the speed of the motor 33. The rear wing 108 is normally in operation during the flight of the machine and this maintains the equilibrium thereof, while the rear wing being shiftable from side to side by means of the steering crank 151, the said wing 108 acts as a rudder for steering the machine, whereby the course thereof through the air is accurately governed.

It will be understood that operative power connections may be provided between the motor 33 and the rear ground wheel 16, whereby the machine may be propelled over the ground by its own power whenever desired.

It will be noted by referring especially to Fig. 1 of the drawings that the planes when operatively geared are always arranged positioned in planes which are at angles to one another, or in other words, the planes of any one wing whether it be a side wing or a steering wing are never positioned lying alining in the same plane.

While the form of the invention herein shown and described is what is believed to be the preferred embodiment thereof, it is nevertheless to be understood that minor changes may be made therein without departing from the spirit and scope of the invention as claimed.

What I claim as new is:—

1. A flying machine comprising a frame, oppositely positioned side wings revolubly mounted upon the said frame, each of the said wings having oppositely arranged revoluble planes, a motor carried by the said frame, operative connections between the said motor and wings, a rear wing of similar construction to the said side wings, controllable operative connections between the said rear wing and motor, and laterally shifting means for the said rear wing adjustably controlled during the steering operation.

2. A flying machine comprising a carriage, a motor mounted thereon, front and rear triangular frames carried by the carriage with their apices projecting downwardly, upward extensions carried by the sides of the said frames, axles journaled through the said extensions arranged in parallelism longitudinally of the machine, opposite flattened winged planes journaled on beams carried by the axles between the opposite ends of the said frame extensions, sprocket wheels arranged at the ends of the said wing axles, sleeves for supporting the said sprocket wheels on the axles, operative connections between the said motor and sprocket wheels, clutch mechanism for the said operative connections, and a rearwardly positioned steering wing right-angularly positioned relative to the side wings.

3. A flying machine comprising a carriage, a motor mounted thereon, front and rear triangular frames carried by the carriage with their apices projecting downwardly, upward extensions carried by the sides of the said frames, axles journaled through the said extensions arranged in parallelism longitudinally of the machine, opposite flattened winged planes journaled on beams carried by the axles between the opposite ends of the said frame extensions, sprocket wheels arranged at the ends of the said wing axles, sleeves for supporting the said sprocket wheels on the axles, operative connections between the said motor and sprocket wheels, clutch mechanism for the said operative connections, sprocket wheels carried by the said sleeves, sprocket chain connections between the said sprocket wheels, and the said planes, operating means for the said sleeves and a rearwardly positioned steering wing right-angularly positioned relative to the side wings.

4. A flying machine comprising a carriage, a motor mounted thereon, front and rear triangular frames carried by the carriage with their apices projecting downwardly, upward extensions carried by the sides of the said frames, axles journaled through the said extensions arranged in parallelism longitudinally of the machine, opposite flattened winged planes journaled on beams carried by the axles between the opposite ends of the said frame extensions, sprocket wheels arranged at the ends of the said wing axles, sleeves for supporting the said sprocket wheels on the axles, operative connections between the said motor and sprocket wheels, clutch mechanism for the said operative connections, sprocket wheels carried by the said sleeves, sprocket chain connections between the said sprocket wheels and the said planes, arms carried by the said sleeve, slides upon the machine frame, pivotal connections between the said slides and arms, pivotal actuating screws for the said slides, operating cranks for the said actuating screws positioned adjacent the said motor, and operative connections between the said cranks and the said actuating screws.

5. A flying machine comprising opposite V-shaped frames, elevating wings oppositely journaled in the said frame longitudinally of the machine, the said wings having oppositely journaled air contacting planes operatively positioned during their outward downward movement and inoperatively positioned during the upward inward movement thereof, a motor, operative connections between the said motor and wings whereby either wing may be individually controlled, a revolubly mounted laterally shiftable wing arranged rearwardly of the frame, shifting means for the said rear wing, operable adjacent the said motor, oppositely arranged planes journaled in the said rear wing, and controllable operative connections between the said motor, rear wing and the planes thereof.

6. A flying machine comprising a supporting carriage, frames mounted upon the front and rear of said carriage, rearwardly projecting braces carried by the rear frame, a bracket pivoted to one of the said braces, a U-shaped steering frame secured to the said bracket, a wing revolubly mounted within the said steering frame and having oppositely arranged revolubly mounted air engaging planes, operating means for the said wing and planes, and adjusting means for the said bracket and steering frame.

7. A flying machine comprising a supporting carriage, frames mounted upon the front and rear of said carriage, rearwardly projecting braces carried by the rear frame, bracket pivoted to one of the said braces, a U-shaped steering frame secured to the said bracket, a wing revolubly mounted within the said steering frame and having oppositely arranged revolubly mounted air engaging planes, a shaft revolubly mounted in the said bracket, a chain pulley upon the said shaft within the said bracket, a motor, controllable operative connections between the said motor and chain pulleys, a sprocket wheel upon the said shaft, operative connections between the said sprocket wheel and the said wing, and operating means for the said planes.

8. A flying machine comprising a supporting carriage, frames mounted upon the front and rear of said carriage, rearwardly projecting braces carried by the said rear frame, a bracket pivoted to one of the said braces, a U-shaped steering frame secured to the said bracket, a wing revolubly mounted within the said steering frame and having oppositely arranged revolubly mounted air-engaging planes, a shaft revolubly mounted in the said bracket, a chain pulley upon the said shaft within the said bracket, a motor, controllable operative connections between the said motor and chain pulleys, a sprocket wheel upon the said shaft, and operative connections between the said sprocket wheel and the said wing, a collar supported by the wing axle, sprocket wheels carried by the said collar, sprocket chain connections between the said collar carried sprocket wheels and the said planes, a controlling shaft journaled upon the said steering frame, rack and pinion connections between the said controlling shaft and collar, and operating means for the said controlling shaft operable at a point adjacent the said motor.

9. A flying machine comprising a supporting carriage, frames mounted upon the front and rear of said carriage, rearwardly projecting braces carried by the rear frame, a bracket pivoted to one of the said braces, a U-shaped steering frame secured to the said bracket, a wing revolubly mounted within the said steering frame and having oppositely arranged revolubly mounted air-engaging planes, a shaft revolubly mounted in the said bracket, a chain pulley upon the said shaft within the said bracket, a motor, controllable operative connections between the said motor and chain pulleys, a sprocket wheel upon the said shaft, operative connections between the said sprocket wheel and the said wing, a collar supported by the wing axle, sprocket wheels carried by the said collar, sprocket chain connections between the said collar carried sprocket wheels and the said planes, a controlling shaft journaled upon the said steering frame, rack and pinion connections between the said controlling shaft and collar, operating means for the said controlling shaft operable at a point adjacent the said motor, an adjusting arm carried by the said bracket, a shiftable adjusting nut, pivotal connections between the said nut and adjusting arm, an operating screw for the said nut, and operating means for the said screw operable at a point adjacent the said motor.

In testimony whereof I affix my signature.

ADOLF ZYTKIEWICZ.